United States Patent [19]

Mehra

[11] Patent Number: 5,330,696
[45] Date of Patent: Jul. 19, 1994

[54] PROCESS OF MAKING LAMINAR ARTICLES OF A POLYOLEFIN AND A NYLON/POLYVINYL ALCOHOL BLEND

[75] Inventor: Vinod K. Mehra, Wilmington, Del.

[73] Assignee: E. I. Du Pont de Nemours and Company, Wilmington, Del.

[21] Appl. No.: 711,966

[22] Filed: Jun. 7, 1991

Related U.S. Application Data

[60] Continuation of Ser. No. 515,699, Apr. 26, 1990, abandoned, which is a division of Ser. No. 181,119, Mar. 17, 1988, Pat. No. 4,950,513.

[51] Int. Cl.$^5$ .................... B29C 47/06; B32B 31/30
[52] U.S. Cl. .................... 264/141; 264/171; 264/288.8; 264/290.2
[58] Field of Search ............ 264/140, 141, 142, 171, 264/210.6, 211.12, 288.8, 290.2, 349

[56] References Cited

U.S. PATENT DOCUMENTS 3,857,754  12/1974  Hirata et al. .................. 264/171 X
4,410,482  10/1983  Subramanian .................. 264/171 X

FOREIGN PATENT DOCUMENTS 217069  4/1987  European Pat. Off. .

OTHER PUBLICATIONS

Ottino, J. M. et al. "Analysis of Transient Sorption and Permeation of Small Molecules in Multiphase Polymer Systems". *Polymer Engineering and Sciences,* vol. 24, No. 2 (Feb. 1984), pp. 153–162.

Huang, R. Y. M. et al. "Separation of Liquid Mixtures by Using Polymer Membranes. I. Permeation of Binary Organic Liquid Mixtures Through Polyethylene". *Journal of Applied Polymer Science,* vol. 12 (1968), pp. 2615–2631.

English-Language Translation of Japanese Reference 48-22,833 (Jul. 1973).

*Primary Examiner*—Leo B. Tentoni
*Attorney, Agent, or Firm*—Cary A. Levitt

[57] ABSTRACT

A laminar article with good barrier properties to oxygenated and hydrocarbon compounds is prepared by blending a polyolefin with about 2 to 39% of a melt blend of a nylon and a polyvinyl alcohol component, using an alkylcarboxyl-substituted polyolefin as a compatibilizer.

10 Claims, No Drawings

PROCESS OF MAKING LAMINAR ARTICLES OF A POLYOLEFIN AND A NYLON/POLYVINYL ALCOHOL BLEND

This is a continuation of application Ser. No. 07/515,699, filed Apr. 26, 1990, now abandoned, which in turn is a division of application Ser. No. 07/181,119, filed Mar. 17, 1988, now U.S. Pat. No. 4,950,513, the disclosure of which is incorporated herein by reference.

BACKGROUND OF THE INVENTION

Laminar articles of a polyolefin and a condensation polymer are described in U.S. Pat. No. 4,410,482 to Subramanian. In particular such laminar articles derived from a polyolefin and nylon have been found to be useful as containers for liquid hydrocarbons, including fuel tanks for motor vehicles. Recent changes in gasoline technology have led to the addition of oxygenated compounds, such as methanol, to an ever increasing proportion of the hydrocarbon fuels now marketed. The loss of a fuel mixture of oxygenated compounds and hydrocarbons by diffusion through the walls of a container with a laminar structure of polyolefin and nylon has in general been found to be sufficiently great as to be unacceptable from an environmental standpoint.

Similar laminar articles in which the nylon barrier resin has been replaced with polyvinyl alcohol or ethylene/vinyl alcohol copolymers have been disclosed in European Patent Application 0015556. These laminar structures have also been found to provide an inadequate barrier towards hydrocarbons containing oxygenated compounds.

Thus a need exists for improved containers for the storage of mixtures of hydrocarbons and oxygenated compounds, such as gas tanks and cans.

SUMMARY OF THE INVENTION

Laminar articles, such as containers, having improved barrier properties toward mixtures of oxygenated compounds and hydrocarbons are provided by the present invention.

Specifically, the present invention provides a laminar article comprising a combination of:

(a) a polyolefin;
(b) a melt blend of a polyamide and a polyvinyl alcohol component; and
(c) an alkylcarboxyl-substituted polyolefin;

wherein the blend (b) is present in the polyolefin (a) as a multitude of thin, substantially two-dimensional, parallel, and overlapping layers.

Blend (b) is a melt blend of a mixture comprising 10–60 weight percent of at least one nylon and 40–90 weight percent of a polyvinyl alcohol component comprising 50–100 percent by weight of a polymer selected from the group consisting of (a) polyvinyl alcohol, (b) saponified copolymers of vinyl acetate containing up to 10 percent by weight of lower alkyl acrylate or lower alkyl methacrylate and (c) mixtures thereof and 0–50 weight percent of an ethylene-vinyl alcohol copolymer containing up to 50 weight percent of ethylene.

Laminar-structured containers prepared according to the present invention lose substantially less material when filled with an oxygenated compound/hydrocarbon mixture than do laminar containers derived from polyolefin, compatibilizer, and either nylon alone or polyvinyl alcohol alone.

A further embodiment of the present invention comprises laminates of a first layer of the material having a laminar structure derived from a polyolefin, compatibilizer, and a melt blend of nylon/vinyl alcohol polymer; and a second layer of a polyolefin comprising 10 to 90 percent of the total thickness of the laminate, said layers being melt bonded together. Preferably the polyolefin in the second layer is the same as that in the first layer.

DETAILED DESCRIPTION OF THE INVENTION

The polyolefin, (a), used in preparing the laminar shaped articles of the present invention includes polyethylene, polypropylene, polybutylene, related copolymers and the like. Polyethylene is preferred and may be high, medium or low density. The polyolefin is preferably present in amounts of about 60 to about 97 percent, most preferably about 80 to about 96 percent.

Component (b) is a melt blend of one or more nylons and polyvinyl alcohol or copolymers thereof. Component (b) is preferably present in amounts of about 2 to about 39 weight percent, and most preferably about 2 to about 15 weight percent.

Useful nylons (polyamides) include both semi-crystalline and amorphous polymers. The polyamides used in the present invention include those semi-crystalline and amorphous resins having a molecular weight of a least 5000 and commonly referred to as nylons. Suitable polyamides include these described in U.S. Pat. Nos. 2,071,250; 2,071,251; 2,130,523; 2,130,948; 2,241,322; 2,312,966; 2,512,606; 3,393,210; and 4,369,305. The polyamide resin can be produced by condensation of equimolar amounts of a saturated dicarboxylic acid containing from 4 to 12 carbon atoms with a diamine containing 4 to 14 carbon atoms. Examples of polyamides include polyhexamethylene adipamide (66 nylon), polyhexamethylene azelamide (69 nylon), polyhexamethylene sebacamide (610 nylon), polyhexamethylene dodecanoamide (612 nylon), poly-11-aminoundecanoic acid, and bis(p-aminocyclohexyl)methane dodecanoamide, and polyamides produced by ring opening of lactams, e.g., polycaprolactam, polylauric lactam. It is also possible in the compositions of the present invention to use polyamides prepared by the copolymerization of two of the above polymers or terpolymerization of three of the above polymers or their components, e.g., an adipic acid, isophthalic acid, hexamethylene diamine copolymer. Polycaproamide and a copolyamide of adipic acid, hexamethylene diamine and caprolactam are preferred.

The other material used in Component (b) is polyvinyl alcohol or a related copolymer or mixtures thereof. All of these polymers are normally made by polymerizing vinyl acetate alone or copolymerizing it with other monomers followed by saponification to obtain the corresponding polyvinyl alcohol homopolymer or copolymer. For use in the present invention the degree of saponification should be greater than 95% and preferably at least 99%. Typically these polymers have number average molecular weights of about 20,000 to 80,000 but their molecular weight is not critical to this invention.

For preparing Component (b), polyvinyl alcohol may be used alone (which is preferred), or copolymers containing up to about 10 weight percent of methyl acrylate or methyl methacrylate or other lower alkyl (meth)acrylates may be used. Blends of two or more of these polymers may also be used. Ethylene/vinyl alcohol copolymers containing up to 50 mole percent ethylene can be used in combination with the aforementioned polyvinyl alcohol or its (meth)acrylate copolymers. The use of ethylene/vinyl alcohol copolymers alone (that is, in the absence of polyvinyl alcohol) is not contemplated because such copolymers by themselves do not provide adequate barrier properties towards fuel mixtures. The ethylene/vinyl alcohol copolymers can be used in amounts of up to 50 weight percent with polyvinyl alcohol or its (meth)acrylate copolymers.

Component (b), the melt blend, will preferably contain about 10-60 weight percent of at least one nylon and about 40-90 weight percent of polyvinyl alcohol or suitable copolymer thereof. Most preferably Component (b) will contain about 20-35 weight percent of at least one nylon and about 65-80 weight percent of polyvinyl alcohol or suitable copolymer thereof. In preparing the melt blend it may be advantageous to incorporate a minor amount of a plasticizer compatible with the polyvinyl alcohol to improve processing of the blend. Other process aids and antioxidants can be added.

The melt blend comprising Component (b) is conveniently prepared by mixing a dry blend of nylon and polyvinyl alcohol or its copolymers in an extruder at a temperature above the melting point of the higher melting component. The material leaving the extruder is preferably stranded, chilled and cut into pellets which are particularly useful for preparing the articles of this invention.

Component (c) is an alkylcarboxyl-substituted polyolefin which serves as a compatibilizer and adheres together adjacent layers of the polyolefin and the melt blend of nylon/polyvinyl alcohol. Use of the compatibilizer is important, because in its absence the polymer layers making up the laminar article do not adhere to one another and the article does not have useful, mechanical properties. Component (c) is preferably present in amounts of about 0.25 to about 12 weight percent, and most preferably about 2 to about 5 weight percent.

The alkylcarboxyl-substituted polyolefin compatibilizer is a polyolefin which has carboxylic moieties attached thereto, either on the polyolefin backbone itself or on side chains. By "carboxylic moiety" is meant carboxylic groups from the group consisting of acids, esters, anhydrides, and salts. Carboxylic salts are neutralized carboxylic acids and a compatibilizer which includes carboxylic salts as a carboxylic moiety also includes the carboxylic acid of that salt. Such compatibilizers are termed ionomeric polymers.

Compatibilizers can be prepared by direct synthesis or by grafting. An example of direct synthesis is the polymerization of an alpha-olefin with an olefinic monomer having a carboxylic moiety; and an example of grafting is the addition of a monomer having a carboxylic moiety to a polyolefin backbone. In the compatibilizer made by grafting, the polyolefin is polyethylene or a copolymer of ethylene and at least one alpha-olefin of 3-8 carbon atoms such as propylene, and the like, or a copolymer including at least one alpha-olefin of 3-8 carbon atoms and a nonconjugated diolefin, such as 1,4-hexadiene, and the like. The polyolefin is reacted with an unsaturated carboxylic acid, anhydride, or ester monomer to obtain the grafted polymer. Representative acids, anhydrides, and esters include methacrylic acid, acrylic acid, ethacrylic acid, glycidyl methacrylate, 2-hydroxy ethylacrylate, 2-hydroxy ethyl methacrylate, diethyl maleate, monoethyl maleate, di-n-butyl maleate, maleic anhydride, maleic acid, fumaric acid, itaconic acid, monoesters of such dicarboxylic acids, dodecenyl succinic anhydride, 5-norbornene-2,3-anhydride, nadic anhydride (3,6-endomethylene-1,2,3,6-tetrahydrophthalic anhydride), and the like. Generally, the graft polymer will have from about 0.01 to about 20, preferably about 0.1 to about 10, and most preferably about 0.2 to about 5 weight percent graft monomer. The most preferred graft polymer is a graft of about 0.25 to about 2 weight percent of maleic anhydride moieties onto a polyethylene backbone. Grafted polymers are described in greater detail in U.S. Pat. Nos. 4,026,967 and 3,953,655.

In the compatibilizer made by direct synthesis, the polymeric material is a copolymer of alpha-olefin of 2-10 carbon atoms and an alpha,beta-ethylenically unsaturated carboxylic acid, ester, anhydride, or salt having 1 or 2 carboxylic moieties. The directly synthesized compatibilizer is made up of at least 75 mole percent of the olefin component and from about 0.2 to 25 mole percent of the carboxylic component.

Ionomeric compatibilizer is preferably made from directly synthesized compatibilizer and is preferably made up of about 90 to 99 mol percent olefin about 1 to 10 mol percent alpha,beta-ethylenically unsaturated monomer having carboxylic moieties wherein the moieties are considered as acid equivalents and are neutralized with metal ions having valences of 1 to 3, inclusive, where the carboxylic acid equivalent is monocarboxylic, and are neutralized with metal ions having a valence of 1 where the carboxylic acid equivalent is dicarboxylic. To control the degree of neutralization, metal ions are present in an amount sufficient to neutralize at least 10 percent of the carboxyl moieties. Representative alpha-olefins and unsaturated carboxylic acid, anhydride, and ester monomers are those previously herein described. Ionomeric polymers are described in greater detail in U.S. Pat. No. 3,264,272.

In making the shaped articles of this invention the polyolefin which provides the continuous phase of the laminar articles is used in amounts of 60-97 weight percent. A preformed melt blend of nylon/polyvinyl alcohol polymer, which is incompatible with the polyolefin, provides the discontinuous phase and is used in amounts of 2-40 weight percent. The compatibilizer is used in amounts of 0.25-12 weight percent. Preferred amounts of the melt blend of nylon/polyvinyl alcohol polymer are 2-15 weight percent in combination with 2-5 percent of compatibilizer.

The articles of the present invention are prepared substantially by the process described in U.S. Pat. No. 4,410,482, which is incorporated herein by reference. The laminated articles are preferably made by mixing together particles of the polyolefin, particles of the previously prepared melt blend of nylon/polyvinyl alcohol and particles of the compatibilizer, heating the mixture to yield a heterogeneous melt of material and forming the melt in a way which results in stretching the melt to yield an elongated discontinuous polymer phase consisting of the nylon/polyvinyl alcohol polymer blend.

In one embodiment, the polymer particles, (components (a), (b), and (c)) in unmelted form are mixed thoroughly so as to provide a statistically homogeneous distribution. Care must be exercised to avoid substantial additional mixing after the polymers have been heated to a melt. In another embodiment, the polymer particles can be combined in softened or molten form so long as the combination of polymers maintains a heterogeneous character. The blend can also be established by combining molten polyolefin with solid particles of nylon/polyvinyl alcohol blend and compatibilizer and then heating the combination. The success of the invention depends on establishing a melted heterogeneous blend of incompatible polymers so that, when the melt is stretched, such as by extrusion forces, one polymer is in the form of a continuous matrix phase and the other polymer is in the form of a discontinuous distributed phase. The polymer comprising the discontinuous phase is present as a multitude of thin, substantially two dimensional, parallel and overlapping layers embedded in the continuous phase.

Although it is not required, it is preferred that the melt blend of nylon/polyvinyl alcohol used in practice of this invention is, as stated, in particulate form; and it is desired that both the polyolefin and the melt blend should be mixed as particles. The particles should, as a general rule, be of a size such that the molten blend of incompatible polymers, when introduced to some melt stretching means, such as extrusion die lips, exhibits the heterogeneity necessary for practice of the invention. When the particles, especially particles of the melt blend, are of too small a size, the melted blend, even though not excessively mixed, tends to function as a homogeneous composition because the domains of material making up the discontinuous polymer phase are so small. When the particles, especially particles of the melt blend, are of too large a size, the melted blend tends to form into shaped articles having a marbleized structure rather than a laminar structure, the large domains of the materials which would make up the discontinuous phase extending to opposite boundaries of the shaped articles and causing disruption of the polyolefin which would make up the continuous phase. Particles about 1–5 mm, preferably about 3 mm on a side are found to be particularly well suited. The particles are preferably generally regular in shape, such as cubical or cylindrical or the like. The particles may, however, be irregular; and they may have one dimension substantially greater than another dimension such as would be the case, for example, when flakes of material are used.

When each of the incompatible polymers is present as individual particles, the particles are generally of approximately the same size although such is not required. The compatibilizer can be provided by itself as individual particles or it can be mixed into, coated onto, or otherwise combined with one or both of the incompatible polymers.

The thickness of the layers of material in the discontinuous phase is a function of the particle size combined with the degree of stretching in the forming step. The particle size of the melt blend which will be the discontinuous phase is generally selected with a view toward obtaining, after stretching, overlapping layers which can be from about 0.5 to 50 micrometers thick or perhaps slightly thicker.

Dry mixing particles of polymers can be accomplished by any well-known means such as by means of a V-blender or a tumble mixer or, on a larger scale, by means of a double-cone blender. Continuous mixing of the particles can be accomplished by any of several well-known methods. Of course, the particles can also be mixed by hand, the only requirement of the mixing being that any two statistical samplings of the mixture in a given mass of material should yield substantially the same composition. The mixing of the incompatible polymers can be accomplished by adding particles of the higher melting polymer to a melt of the lower melting polymer maintained at a temperature below the higher melting point. In that case, the melt is agitated to obtain an adequate mixture; and the mixture is, thus, ready for the heating step.

Once mixed, the incompatible polymers are heated to a temperature greater than the melting point of the highest melting polymer component. It is noted that the heating is conducted to permit stretching the softened or melted blend. In the case of an incompatible polymer which exhibits no well-defined melting temperature, "melting temperature," as used here refers to a temperature at least high enough that the polymer has been softened to the the degree required to stretch it during forming. That heating results in a softened or melted, heterogeneous blend of materials and the heating must be conducted in a manner which avoids substantial additional mixing of the incompatible polymers because such mixing could cause homogenization and could result in a melt and a shaped article of substantially uniform, unlayered composition. The heating can be conducted by any of several well-known means and is usually conducted in an extruder. It has been found that a single-screw extruder of the type which is designed for material transport and not material mixing can be used between the heating and forming steps of this invention without causing homogenization of the two phase incompatible polymer composition. Low shear and low mixing extruders of the kind normally used for polyvinyl chloride, acrylonitrile, or polyvinylidene chloride can be used to practice this invention if they are used in a way to melt and transport the materials and minimize mixing of the components. High shear and high mixing extruders of the kind normally used for nylon and polyethylene should generally not be used. To the extent that the composition prepared on such extruders retains an aspect of heterogeneity, the advantages of this invention can be realized.

The forming step requires stretching of the melted blend followed by cooling. Stretching is an elongation of the two-phase melt to cause a substantial change in the dimensions of the particles in the discontinuous phase. Stretching can be accomplished by any of several means. For example, the melt can be stretched by being squeezed between rollers, pressed between platens, or extruded between die lips. Molding processes such as blow molding also cause stretching in accordance with this process. In the manufacture of shaped articles such as containers, the stretching can be accomplished by a combination of extruding a blend of the heterogeneous melt to yield a container preform or parison followed by blow molding the parison into a finished container.

The stretching can be in a single direction or in perpendicular directions. Whether the stretching is conducted in one direction or two, there should be an elongation of from about 100 to 500 or even 1000 percent or more in at least one direction; an elongation of about 100 to about 300 percent is preferred. While the upper limit set out herein is not critical, the lower limit is critical insofar as inadequate stretching does not yield the improved barriers to fluid permeation which characterize this invention. Avoidance of excessive stretching is important only insofar as excessive elongation of the melt may lead to weakening or rupture of the article.

Stretching is followed by cooling to below the temperature of the melting point of the lowest melting component to solidify the shaped article. The cooling can be conducted by any desired means and at any convenient rate. In the case of stretching by blow molding, the mold is often chilled to cool the article; and, in the case of extruding a film, cooling can be accomplished by exposure to cool air or by contact with a quenching roll.

As previously indicated, a further embodiment comprises laminates of the articles having the laminar structure described hereinbefore with one or two layers of homogeneous polyolefin melt bonded thereto. Examples of such laminates include a laminated film, the first layer of which comprises the laminar-structured material obtained by stretching a melt of the incompatible mixture of polyolefin and nylon/vinyl alcohol polymer plus compatibilizer bonded to a second layer of pure polyolefin, and a blow molded container having an outer laminar-structured barrier layer obtained from the melt of a mixture of polyolefin and nylon/vinyl alcohol polymer plus compatibilizer bonded to an inner layer of polyolefin. The polyolefin which forms the second layer is preferably the same polyolefin used as component (a) in the laminar blend. Under these conditions the layers can be bonded together without the use of an adhesive layer. The preparation of similar laminates which differ in the polymer used to form the discontinuous overlapping barrier layers is described in U.S. Pat. No. 4,416,942.

In another embodiment of the invention, laminated structures can be prepared by coextruding a layer of the heterogenous mixture described above with at least one second layer of polyolefin. The heterogenous mixture is formed in a first extruder as described hereinbefore, while, concurrently, the polyolefin is melt extruded through a second extruder suitable for polyolefins. As the two components are melted in their respective extruders, they are transported from a feed block or combining adaptor into a die where the two components, as coextruded layers, exit the die slot. The combining adaptor is adjusted so that the polyolefin layer comprises 10 to 90 percent, more preferably 50 to 90 percent, of the thickness of the laminate. Containers such as bottles can be produced by coextruding the two or more layers to form a multiple layered parison which can be inflated in a suitable mold to form the desired article.

These laminates exhibit improved fluid barrier properties toward hydrocarbons containing oxygenated solvents compared with those of a single layer of laminar material of the same thickness and having the same amount of the discontinuous phase of nylon/vinyl alcohol polymer. Thus the laminates maximize the utilization of the nylon/vinyl alcohol barrier resin in heavy walled containers which may be required for demanding applications such as fuel tanks and 55-gallon drums. At the same time, impact properties of blow molded tanks and drums are improved because the majority of the wall thickness consists of homogeneous polyethylene.

The blends and laminates of the present invention may be used as containers for hydrocarbon and oxygen-containing liquids, and also may be used to form sheets, films, tubes, pipes, and the like. A particularly contemplated use is for fuel tanks for motor vehicles.

COMPARATIVE EXAMPLE 1

Blends were made from particles of polyolefin, nylon and compatibilizer which were mixed in a polyethylene bag prior to processing. The nylon used was a copolyamide prepared by condensing hexamethylenediamine, adipic acid and caprolactam to give a composition containing about 80 weight percent polyhexamethylene adipamide and 20 weight percent polycaproamide. The polyethylene used was linear polyethylene, having a density of 0.953 gram/cubic centimeter, a melt index of 10 gram/10 min as determined according to ASTM D-1238 (condition F).

The compatibilizer was obtained by melt grafting fumaric acid onto polyethylene having a density of 0.958 g/cubic centimeter and a melt index of about 10, as determined according to ASTM D-1238. The fumaric acid was grafted onto polyethylene in an amount of about 0.9 weight percent based on total weight of polymer in accordance with the teaching of U.S. Pat. No. 4,026,967.

The following compositions were used:

Copolyamide, 7 wt %; compatibilizer, 3.5 wt %; and polyethylene, 89.5 wt %. The mixture was fed to Rocheleau Model 7A continuous extrusion blow molding machine equipped with a 2:1 compression ratio screw (diam. 38.1 mm) without any mixing tip. Bottles with a capacity of approximately 1000 mL were blow molded at an extrusion temperature of about 225°–230° C. The bottles weighed approximately 62 grams. The side walls were about 1 mm thick, and showed laminar distribution of the barrier resin, i.e., the copolyamide.

The effectiveness of the barrier was determined by filling the test containers with 10% by volume methanol/xylene and 3% by volume methanol/xylene mixtures and determining the weight loss at room temperature over a period of several weeks. For each solvent mixture, triplicates were run. The bottles were weighed periodically and their weight loss was plotted against time and average steady state weight loss was determined for each run. Based on known weight of container and its geometry, the surface area and average thickness were calculated (ASTM-2684). The permeability values (P) were calculated. The results are summarized below:

| Mixture, by volume | P; g.mm/day.m$^2$ |
|---|---|
| 10% methanol/xylene | 14.3 |
| 3% methanol/xylene | 11.2 |

COMPARATIVE EXAMPLE 2

In another run using the same materials, laminar bottles were made from 10.8 wt % of copolyamide, 5.7 wt. % compatibilizer and 83.5 wt % polyethylene to yield following barrier results:

| Mixture, by volume | P; g.mm/day.m$^2$ |
|---|---|
| 10% methanol/xylene | 12.3 |

Thus, there is very little improvement in barrier properties when the nylon content is increased. In addition, there is only a slight improvement of barrier properties when the methanol content of the mixture is lowered to 3% from 10% (as shown in Comparative Example 1.)

EXAMPLE 1

The barrier material used in this example was a melt blend of the copolyamide used in Comparative Example 1 and polyvinyl alcohol (PVOH). PVOH having a number average molecular weight of approximately 30,000 and a 99+% degree of saponification was washed with methanol to reduce the level of sodium acetate present. After drying, the PVOH was blended with 10 wt. % mixed isomers of o- and p-N-ethyl toluene sulfonamide ("Santicizer 8", sold by Monsanto) as plasticizer, 2000 ppm octanoic acid process aid and 1000 ppm 1,3,5-trimethyl-2,4,6-tri-(3,5-di-tert.-butyl-4-hydroxybenzyl) benzene as antioxidant in a twin screw extruder at a melt temperature of approximately 230° C. Then, 100 parts by weight of the compounded PVOH and 50 parts by weight of the copolyamide were melt blended in a single screw extruder at a melt temperature of approximately 230° C. to yield a nylon/PVOH melt blend. The material exiting the extruder was pelletized. Laminar bottles were prepared as in Comparative Example 1 using 10 wt % of the nylon/PVOH blend, 3.5 wt. % of the compatibilizer of Comparative Example 1 and 86.5 wt % of the polyolefin used in Comparative Example 1. The effectiveness of the barrier is given below:

| Mixture, by volume | P; g.mm/day.m$^2$ |
|---|---|
| 10% methanol/xylene | 2.3 |
| 3% methanol/xylene | 2.3 |

Clearly there is a significant improvement in the effectiveness of the barrier toward mixtures of hydrocarbons and an oxygenated solvent.

EXAMPLE 2

Washed PVOH used in Example 1 was compounded with 10 wt % triethylene glycol plasticizer in a twin screw extruder at a melt temperature of about 230° C. A nylon/PVOH blend was prepared by melt mixing 26.5 parts by weight of the copolyamide used in Comparative Example 1 and 73.5 parts by weight of the plasticized PVOH composition. Laminar bottles were made as in Comparative Example 1 from 7 wt % of the nylon/PVOH blend, 3.6 wt. % of the compatibilizer used in Comparative Example 1 and 89.4 wt % of the polyethylene used in Comparative Example 1. The effectiveness of the barrier is given below:

| Mixture, by volume | P; g.mm/day.m$^2$ |
|---|---|
| 5% methanol/xylene | 1.5 |

The superiority of the laminar bottles of this invention compared with the laminar bottles of Comparative Example 1 is clearly evident.

EXAMPLE 3

For this example, the same nylon/PVOH blend used in Example 2 was employed, and 1 L bottles were made from 7 wt % of nylon/PVOH, 4 wt % compatibilizer, and polyethylene. However, an accumulator head machine (Hayssen Model Econo Blow, accumulator capacity 454 g, 50.8 mm dia. screw without mixing tip) was used to fabricate 1 liter bottles. The side walls had laminar structure. The barrier results are summarized below:

| Mixture, by volume | P; g.mm/day.m$^2$ |
|---|---|
| 15% methanol/unleaded gas | 1.7 |

Thus, there is also significant improvement in barrier properties to mixed solvent containing methanol when the composition processed on an accumulator head blow molding machine.

EXAMPLE 4

The same formulation and equipment of Example 3 was used. However, 3.8 L (one gallon) laminar containers (220 g) were fabricated using a different mold. The following barrier results were obtained:

| Mixture, by volume | P; g.mm/day.m$^2$ |
|---|---|
| 15% methanol/xylene | 2.2 |

Thus, improved barrier properties are retained for this larger container toward the mixed solvent.

EXAMPLE 5

A barrier material was made by melt blending 100 parts by weight of the compounded PVOH used in Example 1 and 50 parts by weight of an amorphous nylon (prepared from 70 mole % isophthalic acid, 30 mole % terephthalic acid, 94 mole % hexamethylene diamine and 6 mole % bis(p-aminocyclohexyl)methane by the procedure described in Example 1 of U.S. Pat. No. 4,369,305). One liter laminar containers were made on the Rocheleau machine as described in Comparative Example 1 using a mixture of 10 wt. % nylon/PVOH blend, 3.5% of the compatibilizer used in Comparative Example 1 and 86.5 wt. % the polyethylene used in Comparative Example 1. The following barrier properties were observed:

| Mixture, by volume | P; g.mm/day.m$^2$ |
|---|---|
| 10% methanol/xylene | 3.2 |

Thus improved barrier properties are obtained with amorphous nylon as well as semi-crystalline nylon.

EXAMPLE 6

A barrier material was made by melt blending 74 parts by weight of the compounded PVOH used in Example 2 with 26 parts by weight of polycaproamide (nylon 6). One liter laminar bottles were made on the Rocheleau machine as described in Example 1 from a mixture of 4.2 wt. % of the nylon PVOH blend, 2.8 wt. % of the compatibilizer used in Comparative Example 1 and 93 wt. % of the polyethylene used in Comparative Example 1. Barrier properties were measured at 40° C. with a 60% fill and extrapolated to room temperature by dividing the permeability at 40° C. by 4. The results are as follows:

| Mixture, by volume | P; g.mm/day.m$^2$ |
|---|---|
| 15% methanol/xylene | 3.9 |

Thus improved barrier properties are also obtained when the nylon/PVOH melt blend is based on polycaproamide homopolymer.

EXAMPLE 7

A melt blend was prepared as in Example 1 from 26 parts by weight of the nylon used in Comparative Example 1 and 74 parts by weight of a copolymer of polyvinyl alcohol (saponification product of a copolymer of vinyl acetate containing 5.5 wt. % methyl methacrylate, number average molecular weight 34,000). One liter bottles were made on the Rocheleau machine as described in Example 1. The polymer mixture used was 4.2 wt. % nylon/PVOH copolymer blend, 2.8 wt. % of the compatibilizer used in Comparative Example 1 and 93 wt. % of the polyethylene used in Comparative Example 1. The following results, calculated as in Example 6, were obtained:

| Mixture, by volume | P; g.mm/day.m$^2$ |
|---|---|
| 15% methanol/xylene | 3.9 |

Thus the methyl methacrylate copolymer also provides improved barrier properties.

EXAMPLE 8

Example 7 was repeated except that the methyl methacrylate/PVOH copolymer was replaced by an equal weight of another copolymer of polyvinyl alcohol; namely, the saponification product of a copolymer of vinyl acetate containing 9 wt. % methyl acrylate, number average molecular weight 30,000. The following results, calculated as in Example 6, were obtained:

| Mixture, by volume | P; g.mm/day.m$^2$ |
|---|---|
| 15% methanol/xylene | 6.2 |

Thus the results of the two PVOH copolymers towards mixed solvents are about equivalent.

EXAMPLE 9

A melt blend was prepared from a mixture of 37 parts by weight of the compounded PVOH described in Example 1, 37 parts by weight of an ethylene-vinyl alcohol copolymer containing 30 mole % ethylene (Melt Index, 3) and 26 parts by weight of the copolyamide used in Comparative Example 1. One liter laminar bottles were made on the Rocheleau blow molding machine from a mixture of 3.8 wt. % of the ternary melt blend, 3.85 wt. % of the compatibilizer of Comparative Example 1 and 92.35 wt % of the polyethylene used in Comparative Example 1. The following barrier properties, calculated as in Example 6, were observed:

| Mixture, by volume | P; g.mm/day.m$^2$ |
|---|---|
| 15% methanol/xylene | 6.2 |

Improved barrier characteristics are retained when half of the PVOH is replaced by ethylene/vinyl alcohol copolymer.

EXAMPLE 10

For this example, 90 parts by weight of the PVOH used in Example 1 with the washing step omitted was mixed with 10 parts by weight of triethylene glycol plasticizer. The compounded PVOH (74 parts by weight) was then melt blended with 26 parts by weight of the copolyamide used in Comparative Example 1. Laminar bottles were made as in Comparitive Example 1 on the Rocheleau machine from a mixture of 4.2 wt. % of the nylon/PVOH melt blend, 3.8 wt. % of the compatibilizer used in Comparative Example 1 and 92 wt. % of the polyethylene used in Comparative Example 1. The following barrier properties, calculated as in Example 6, were observed:

| Mixture, by volume | P; g.mm/day.m$^2$ |
|---|---|
| 15% methanol/xylene | 2.0 |

Excellent barrier properties are obtained when an unwashed commercial grade of PVOH containing significant amounts of sodium acetate is used.

EXAMPLE 11

A melt blend was prepared from 74 parts by weight of the PVOH used in Example 1 with the washing step omitted and 26 parts by weight of the copolyamide used in Comparative Example 1. No plasticizer was added to the PVOH. Laminar bottles were made as in comparative example 1 on the Rocheleau machine from a mixture of 4.2 wt. % of the nylon/PVOH melt blend, 3.8 wt. % of the compatibilizer used in Comparative Example 1 and 92 wt. % of the polyethylene used in Comparative Example 1. The following results, calculated as in Example 6, were obtained:

| Mixture, by volume | P; g.mm/day.m$^2$ |
|---|---|
| 15% methanol/xylene | 4.3 |

Thus improved barrier properties toward mixed solvents are obtained with unplasticized commercial PVOH.

I claim:

1. A process for preparing a laminar article of polymeric material, comprising the steps of:
   (a) selecting a polyamide and a polyvinyl alcohol component, to function as a barrier in said laminar article;
   (b) preparing a melted blend of said polyamide and said polyvinyl alcohol component;
   (c) combining about 2 to about 39 percent by weight of the melted blend with about 60 to about 97 percent by weight of a polyolefin and about 0.25 to about 12 percent by weight of an alkylcarboxyl-substituted polyolefin at a sufficient temperature to melt all the components, thereby forming a melted heterogeneous mixture;
   (d) forming the melted heterogeneous mixture by (i) stretching a body of the mixture and (ii) cooling the stretched body to below the melting point of the lowest melting polymer component whereby the blend of (b) is present in a polyolefin matrix as a multitude of thin, substantially two-dimensional, parallel, and overlapping layers.

2. The process of claim 1 wherein the melted blend of a polyamide and a polyvinyl alcohol component is pelletized and combined with particles of polyolefin and alkylcarboxyl-substituted polyolefin, followed by heating to form a melted heterogeneous mixture.

3. A process for preparing a laminar article of polymeric material, comprising the steps of:
   (a) selecting a polyamide and a polyvinyl alcohol component, to function as a barrier in said laminar article;
   (b) preparing a melted blend of said polyamide and said polyvinyl alcohol component;

(c) pelletizing the blend of polyamide and polyvinyl alcohol component to form pellets having dimensions of about 1 to about 5 mm;

(d) combining about 2 to about 39 percent by weight of said pelletized blend with particles of about 60 to about 97 percent by weight of a polyolefin and about 0.25 to about 12 percent by weight of an alkylcarboxyl-substituted polyolefin;

(e) heating said combination at a sufficient temperature to melt all the components, thereby forming a melted heterogeneous mixture; and (f) forming the melted heterogeneous mixture by (i) stretching a body of the mixture and (ii) cooling the stretched body to below the melting point of the lowest melting polymer component whereby the blend of (b) is present in a polyolefin matrix as a multitude of thin, substantially two-dimensional, parallel, and overlapping layers.

4. The process of claim 3 wherein the stretching results in an elongation of the body of the mixture of at least about 100 percent in at least one direction.

5. The process of claim 2 wherein the melted blend of step (b) is prepared by melt blending at least about 40 weight percent polyvinyl alcohol component with up to about 60 weight percent polyamide.

6. The process of claim 5 wherein the amount of polyvinyl alcohol component is about 65 to about 90 weight percent and the amount of the polyamide component is about 10 to about 35 weight percent.

7. The process of claim 3 wherein the melted blend of step (b) is prepared by melt blending at least about 40 weight percent polyvinyl alcohol component with up to about 60 weight percent polyamide.

8. The process of claim 7 wherein the amount of polyvinyl alcohol component is about 65 to about 90 weight percent and the amount of the polyamide component is about 10 to about 35 weight percent.

9. The process of claim 1 wherein the loading of the polyamide in the final composition is in the range of about 0.2 to about 24 weight percent and the loading of the polyvinyl alcohol is in the range of about 0.8 to about 35 weight percent.

10. The process of claim 1 wherein the loading of polyamide in the final composition is in the range of about 0.2 to about 9.2 weight percent, and the loading of the polyvinyl alcohol is in the range of about 0.8 to about 13.3 weight percent, and wherein the total amount of polyamide and polyvinyl alcohol in the final composition is in the range of about 2 to 15 weight percent.

* * * * *